Sept. 22, 1959  T. R. FREDRIKS  2,905,503
VEHICLE VENTILATION WINDOWS
Filed Feb. 10, 1954  2 Sheets-Sheet 1
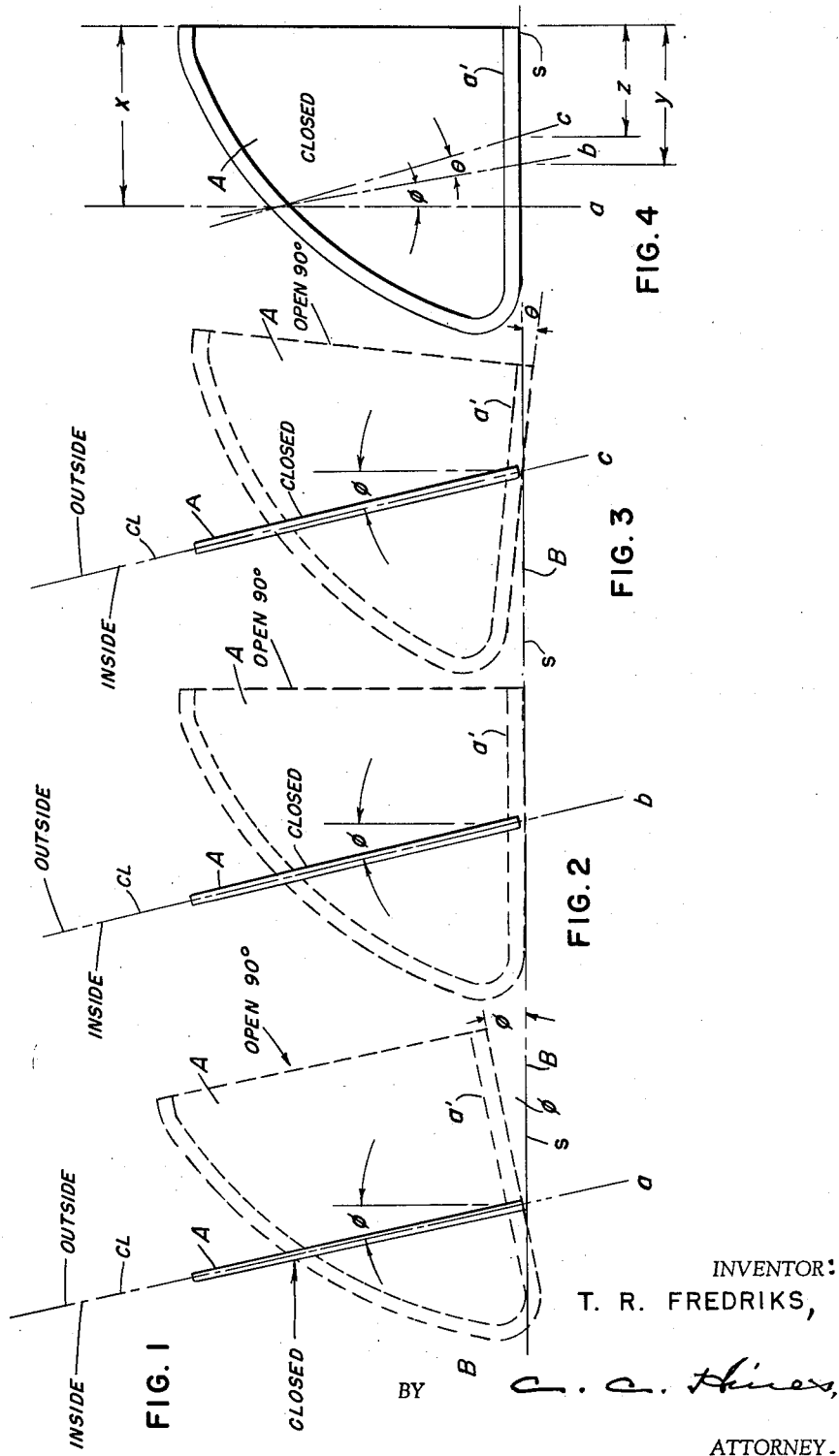
INVENTOR:
T. R. FREDRIKS,
BY
ATTORNEY.

Sept. 22, 1959  T. R. FREDRIKS  2,905,503
VEHICLE VENTILATION WINDOWS
Filed Feb. 10, 1954  2 Sheets-Sheet 2

INVENTOR:

T. R. FREDRIKS,

BY

ATTORNEY.

United States Patent Office 2,905,503
Patented Sept. 22, 1959

2,905,503

VEHICLE VENTILATION WINDOWS

Theodore R. Fredriks, Yonkers, N.Y.

Application February 10, 1954, Serial No. 409,315

4 Claims. (Cl. 296—44)

This invention relates to outwardly draining ventilation windows especially of the "no-draft" type such as are used on automobiles, diesel locomotives, and other power-driven vehicles. These windows, which are of generally triangular form or sector-shaped, are pivotally mounted within a window frame to swing from a closed position to an open position in which the front portion of the ventilator moves inwardly and the rear portion thereof moves outwardly through the window opening. Such windows as conventionally mounted for non-draft ventilation have the drawback that when in open position they permit water collecting thereon to drain off their bottom edges into the vehicle when the vehicle is standing or in motion.

This condition exists because the window rotates about an axis, through mounting hinges or pivots, which is substantially perpendicular to a longitudinal axis through the vehicle and sloped laterally.

The object of the present invention is to provide a mounting for pivoted ventilators of this type for movable or fixed enclosures which, in a simple, reliable and effective manner, overcomes this objection without detriment to the non-draft efficiency of the ventilator.

In the accompanying drawings, exemplificatively illustrative of the invention,

Figure 1 is a diagrammatic view, partly in alternative position illustrating the prior art.

Figures 2 to 4, inclusive, are diagrammatic views explanatory of the invention, the dotted lines therein indicating alternative positions of the window.

Figure 5:
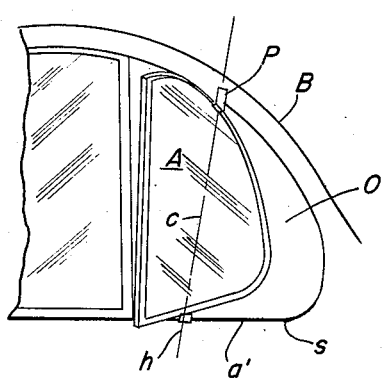
Figures 5, 6 and 7 are elevational views looking from the exterior toward a portion of a side of a vehicle equipped with the ventilator and respectively showing the ventilator in a partially open position, fully closed position and in fully open position.

Figure 1 of the drawing illustrates the ordinary mounting in the window opening O (Figs. 5, 6, 7 and 8) of the right front window A in the closed position looking from the rear to the front of the vehicle B. The conventional axis "a" having an inward angle φ relative to vertical is the axis about which the window rotates. Figure 1 also shows in dotted lines in face view the outline of the window when rotated into its fully open position, at 90 degrees to the axis of the vehicle and illustrates the angle that the bottom edge a' of the window then makes in respect to the horizontal, this angle also being φ. Thus it may be seen that water collecting on the window will drain, along the bottom edge a' of the window and flow inwardly beyond the sill S and run or drip into the vehicle. Figure 3 shows the present axis or center line "a" in its usual position perpendicular to the axis of the vehicle.

The purpose of this invention as set forth is to change the axis around which the window rotates from the closed to the open position so that the bottom edge of the window will not be declined downward to the inside of the vehicle, that is, will be horizontal, or will be at least slightly declined toward the outside of the vehicle or other enclosure, which will reduce or eliminate the movement of water by gravity to the inside of a stationary enclosure or of the vehicle even when the vehicle is stationary.

Figure 2 of the drawing shows a window in closed position and also diagrammatically in dotted lines in open position with the bottom edge of the window horizontal when the window has been rotated 90 degrees around axis "b." Figure 4 shows the slope angle axis "b" makes with respect to a plane perpendicular to the vehicle axis to accomplish this result and it will be observed that this angle is equal to the inward slope φ of the window relative to the vertical.

Figure 3 of the drawing shows the rear edge of a window A in closed position and also shows diagrammatically in dotted lines the bottom edge of the window sloping downward to the outside at the angle θ in respect to the horizontal when the window has been rotated 90 degrees around axis "c" to the open position. Figure 4 shows the slope angle φ, plus angle θ, axis "c" makes with respect to a plane perpendicular to the axis of the vehicle to accomplish this result. As stated, Figs. 1, 2 and 3 all show in full lines the window in closed position viewed from the rear and each of said figures also shows the center line c1 of the window when closed, while Fig. 4 is a diagrammatic side view of the window viewed from the outside and shows the relative positions of the axes of swinging a, b, and c, respectively, of the arrangements of Figs. 1, 2, and 3 for the window to reach the position diagrammatically shown as open 90° in said figures, and shows the angle φ which axis b makes with the vertical and the angle φ plus θ which axis c makes with the vertical. In Fig. 4, reference character x represents the distance of the top pivot point from the rear edge of the window while y and z represent, respectively, the distances of bottom pivots of the windows of Figs. 2 and 3 from the rear edge of the window.

Distances X, Y and Z in Figure 4 may be varied to proportion the areas of the window extending into and outside the vehicle when the window is in the open position.

The arrangement would also be applicable to rear ventilating windows as in the case of automobiles.

Conditions other than those set forth in the sketch and described in the foregoing paragraphs where the proposed hinge or pivot arrangement would be applicable are as follows:

(1) If the bottom edge of the closed window slopes upward from the rear to the front, the angle of this slope in respect to the horizontal can be subtracted from the angles φ or φ plus θ the hinge or pivot axis makes in respect to the perpendicular longitudinally to arrive at the desired condition as illustrated in Figures 2 and 3. By using an inclination of the rotating axis less than φ, as shown in Figure 4, the bottom edge of the window, when the window is swung open, will be caused to slope downwardly towards the inside of the vehicle or other enclosure, while an inclination of the rotating axis at angle φ of Figures 2 and 4 would cause the bottom of the window when the window is swung open, to be disposed horizontally, as shown in Figure 2. However, by inclining the axis of rotation at an angle φ plus θ as contemplated by my invention, a slope to the outside of the bottom of the window is produced when the window is swung open, which is sufficient to materially reduce or stop the flow of moisture to the inside, in accordance with the angular arrangement indicated in Figure 4 whereby the pivotal mounting of the window itself is adapted to perform a double function, i.e. firstly, that of a pivotal support from the window, and, secondly, that of a guiding agent to direct the window to a moisture shedding position and avoid the use of any auxiliary means for said purpose.

(2) If the top hinge or pivot is mounted outside the center line through the window as is usually the case, the axis through the hinges or pivots will form an angle less than φ in respect to the vertical in Figures 1, 2 and 3, and the difference between this angle and angle φ may be subtracted from angles φ or φ plus θ in Figure 4 to produce the same desired conditions as illustrated in Figures 2 and 3.

(3) If the hinge or pivot center line is vertical transversely, the hinges or pivots may be mounted so their center line makes an angle θ in respect to the vertical longitudinally. This will provide a slope, angle θ, to the bottom edge of the window down from the inside to the outside.

Figs. 5, 6, 7, and 8 show exemplificatively but more constructively the mounting of the ventilator window on a vehicle.

Figure 6:
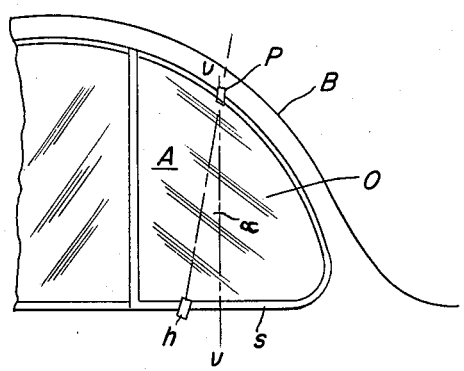
Figure 8:
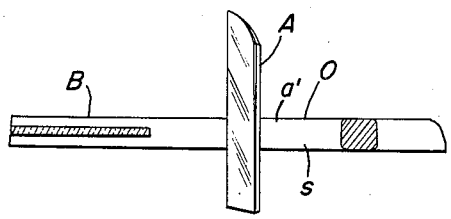
Figure 8 is a sectional plan view through the window frame taken on line 8—8 of Fig. 7 showing the window opened to a 90° angle.
Figure 7:
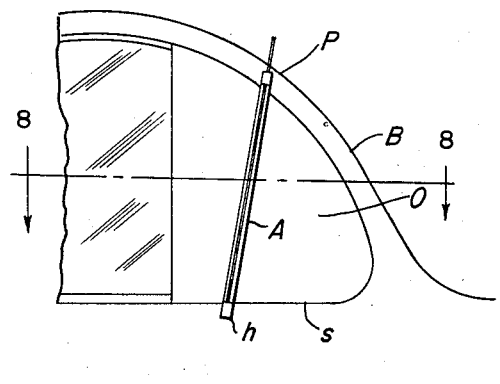

As shown in these figures the window A is mounted at the top and bottom on hinges or pivots p and h at a forward and upwardly inclined angle, in accordance with the angle C arrangement indicated in Figure 4, and at a required lateral angle so that its rear portion will swing outwardly and its front portion will swing inwardly to open position, in which position its bottom rail will slope downward in the outward direction to discharge collected moisture outwardly from the vehicle. Although the window A depicted in Figs. 5 and 6 is intended to represent a front window of a vehicle it is immaterial whether it is a front or rear window or whether it is mounted in the wall of a fixed or movable enclosure, the important point being that when it is swung to open position its lower edge will slope downwardly in the outside direction to deposit water outside the enclosure. Figure 6 shows the window fully closed and the angle between a vertical line v passing through the upper pivot P and the axis of rotation Ph of the window is designated α. Figures 7 and 8 show the window in fully open 90° position.

It will be observed that these views clearly show that all moisture deposited on the outside of the partly or fully opened window will drain outside and not into the vehicle, and that this drain action is obtained when the window is in either of these positions without the use of any auxiliary special water collecting and drainage device attached to the window and without decreasing in any manner the "non-draft" efficiency of the window.

In practice, the hinges or pivots h and p may be of any conventional type or any type in procurable or modified form suitable for mounting a window in the manner described to perform its outside drain function and also, if desired, to maintain its non-draft ventilating function.

Having thus described my invention, I claim:

1. In combination an enclosure wall having extent in the vertical direction and having a window opening therein, a ventilation window having side edges, a top edge, and a bottom edge which is approximately horizontal when in closed position to fit in said opening when in closed position, upper and lower pivots mounting said window in the edges of said wall bordering said opening, said pivots engaging said edges, respectively, of said window at two positions, one located higher than the other to provide for rotation of said window to open position with the portion of said window on one side of the axis rotating inwardly of said wall and the portion of said window on the other side of said axis rotating outwardly of the wall, the lower pivot being located spaced with respect to a vertical line passing through the upper pivot, in the direction of the side edge of said portion of said window which rotates outwardly during opening, whereby when the window is open its bottom edge slopes downwardly in the outward direction.

2. The combination as set forth in claim 1, and in which said wall is inclined inwardly relative to the vertical in the upward direction, and in which the axis of rotation extending through said pivots forms with a vertical plane perpendicular to said wall and extending through said bottom pivot an angle which is at least as great as the angle of inclination of said wall relative to the vertical.

3. The combination as set forth in claim 2, and in which said angle between said axis of rotation and said vertical plane is greater than the inclination of said wall to the vertical.

4. The combination set forth in claim 1, and in which said wall is a wall of a vehicle and the edge of said window to which said lower pivot is closest is located opposite the normal direction of travel of the vehicle.

References Cited in the file of this patent

UNITED STATES PATENTS 2,295,277 Wilshusen _____ Sept. 8, 1942
2,570,744 Anderson _____ Oct. 9, 1951